(12) United States Patent
Rosengren

(10) Patent No.: US 6,792,001 B1
(45) Date of Patent: * Sep. 14, 2004

(54) METHOD AND DEVICE FOR TRANSMITTING DATA PACKETS

(75) Inventor: Jurgen F. Rosengren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 821 days.

This patent is subject to a terminal disclaimer.

(21) Appl. No.: 09/666,228

(22) Filed: Sep. 21, 2000

Related U.S. Application Data

(63) Continuation of application No. 08/537,701, filed as application No. PCT/IB95/00116 on Feb. 23, 1995, now Pat. No. 6,181,712.

(30) Foreign Application Priority Data

Feb. 25, 1994 (EP) .............................................. 94200477

(51) Int. Cl.⁷ ................................................. H04J 3/16

(52) U.S. Cl. ........................................ 370/474; 370/516

(58) Field of Search ................................. 370/229, 230, 370/474, 462, 461, 395.1, 445, 444, 447, 448, 449, 451, 516, 517, 520, 514, 512, 510, 509, 508, 506, 503, 470, 390, 475, 389, 472, 442, 476; 348/497, 469

(56) References Cited

U.S. PATENT DOCUMENTS 5,754,768 A * 5/1998 Brech et al. ................. 709/230
6,181,712 B1 * 1/2001 Rosengren ................... 370/474

* cited by examiner

*Primary Examiner*—Dang Ton

(57) ABSTRACT

Method and device for transmitting data packets from an input stream of data packets into an output stream of packets. When a plurality of transport streams is multiplexed, packet jitter may be introduced to such an extent that decoder buffers can overflow or underflow. This is avoided by associating a time window with a data packet and accommodating position information in the packet about the position of the data packet within the window.

1 Claim, 2 Drawing Sheets

METHOD AND DEVICE FOR TRANSMITTING DATA PACKETS

CROSS REFERENCE TO RELATED APPLICATIONS

This is a continuation of application Ser. No. 08/537,701, filed Oct. 11, 1995 now U.S. Pat. No. 6,181,712 which is a 371 of PCT/IB95/00116 filed Feb. 23, 1995.

FIELD OF THE INVENTION

The invention relates to a method and a device for transmitting data packets. In particular, the invention relates to a method and a device for transmitting data packets from an elementary MPEG stream in a transport stream.

BACKGROUND OF THE INVENTION

In "Information technology—Generic coding of moving pictures and associated audio information—Part 1: Systems", published Dec. 1, 1993, as Draft International Standard ISO/IEC CD 13818-1, and hereinafter referred to as CD 13818-1, a system is disclosed for transmitting MPEG encoded video and audio signals as well as data. Elementary MPEG streams of data are packetized. The packets are multiplexed so as to form a program stream or a transport stream. The transport stream thus constitutes a packet-based time multiplex transmission channel. Data is transmitted in transport packets of 188 bytes each. Each transport packet belongs to exactly one elementary stream. One or more elementary streams make up a program. Each elementary stream has a data rate, which may be variable or constant.

Since more than one elementary streams share one transport stream, and because of quantization effects due to the fixed length of a transport packet, the spacing of the transport packets of one elementary stream will not be uniform. This effect is referred to as "jitter". This is illustrated in FIG. 1 which shows an example of a typical transport stream. The packets P1,P2, . . . shown in the Figure are packets from one elementary stream. Due to jitter they are not equally spaced.

To compensate for jitter, a video or audio decoder will have to have a buffer oversize. On page 15 of CD 13818-1, said buffer oversize is specified as a portion of the decoder buffer size. The jitter may never be so large that it causes an underflow (packet arriving too late) or an overflow (packet arriving too early) of the buffer in the Target Decoder. A transport stream fulfilling this and other requirements is referred to as a "legal" MPEG2 transport stream.

In many applications, it will be necessary to perform a remultiplexing of a transport stream. A remultiplexing operation is understood to mean any operation which has one or more legal MPEG2 transport streams as input stream and produces a legal MPEG2 transport stream as the output stream. Examples of remultiplexing operations are:
1) Joining several transport streams containing one program to a multi-program transport stream,
2) Adding a program to a multi-program transport stream, creating a new transport stream,
3) Selecting some programs from a multi-program transport stream, creating a new transport stream, and
4) Recording one program selected from a multi-program transport stream.

The problem in a remultiplexing operation is that the remultiplexer cannot know the original scheduling moment of a certain transport packet belonging to a certain elementary stream. When the remultiplexer produces its output stream, it may be impossible to schedule the packet in the right position. The remultiplexer must then choose whether to schedule the packet earlier or later. In both cases, the jitter of that packet is changed. Since the remultiplexer does not know the original scheduling moment, it cannot be sure that the output stream is legal.

Furthermore, the draft MPEG2 systems standard CD 13818-1 allows the transmission of elementary streams having a variable bit-rate. After a certain number of remultiplexing steps, the jitter added by each step will have changed the momentary rate of the elementary stream in an unpredictable manner. It is not possible to reconstruct the original rate because no information about the original scheduling moment of a certain packet is available.

OBJECT AND SUMMARY OF THE INVENTION

It is an object of the invention to provide a method of transmitting data packets in which the above mentioned problems are alleviated.

According to the invention, the method of transmitting data packets from an elementary stream of data packets into an output stream of data packets comprises the step of associating a time window with a data packet and accommodating position information in the packet about the position of said data packet within said window. A packet can then be scheduled anywhere within said window without violating buffer constraints.

In a preferred embodiment of the invention, the position information takes the form of a parameter included in said data packet, for example the offset of the start of the packet with reference to the start of the window.

Transmitting the offset parameter in each packet would create too much overhead. Therefore, in yet another embodiment, the position information includes a further parameter representing the distance between the time windows associated with successive data packets from the same elementary stream. The-position information of other packets can then be calculated.

BRIEF DESCRIPTION OF THE FIGURES

The invention will now be elucidated by way of a description of embodiments and drawings, in which.

DESCRIPTION OF EMBODIMENTS

Figure 1:
FIG. 1, already discussed, is a diagram illustrating the problem underlying the invention.
Figure 2:
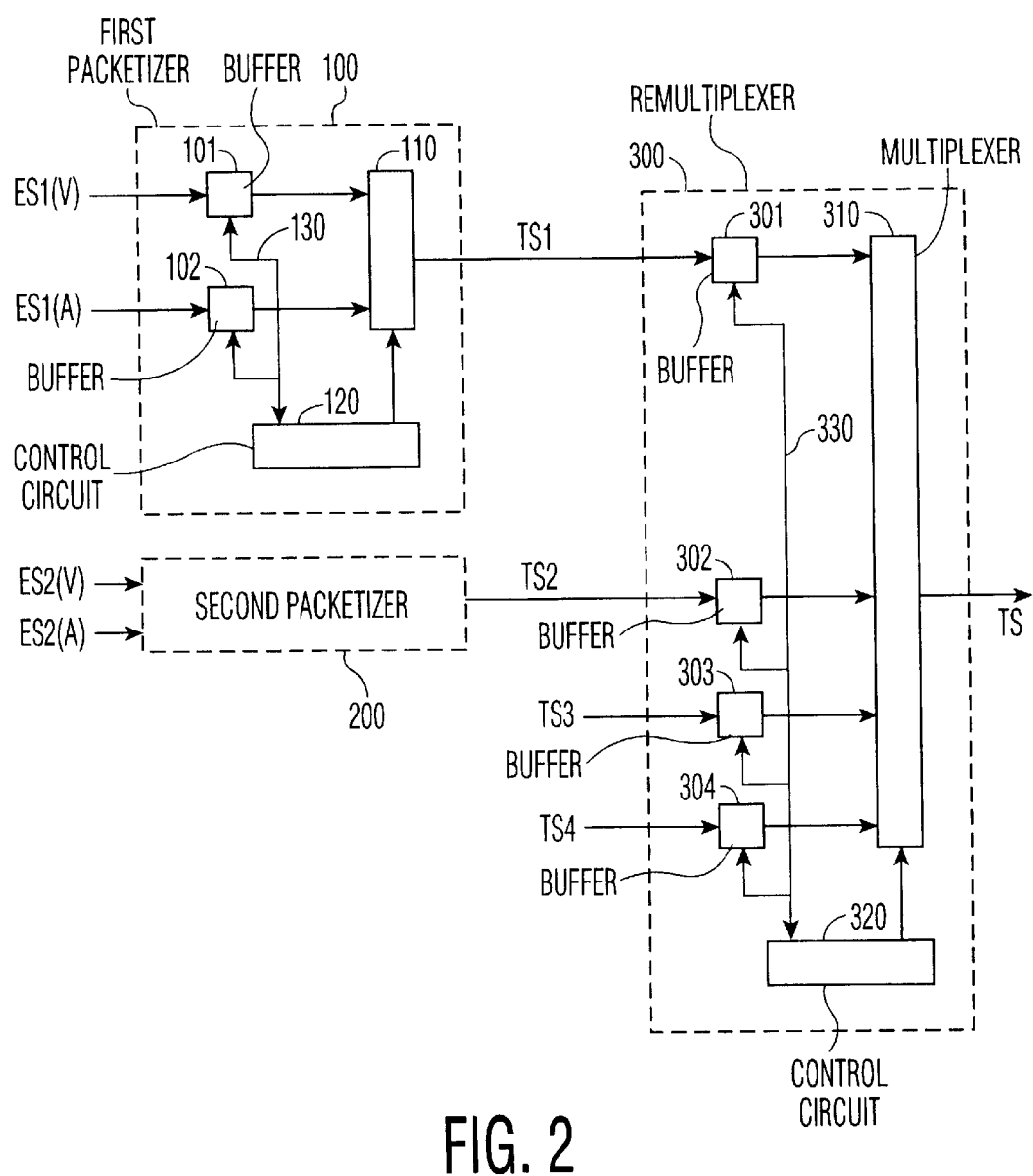
FIG. 2 shows a device for carrying out the method according to the invention.

FIG. 2 shows a device for transmitting a plurality of audiovisual programs through a channel. The device comprises a first packetizer 100 which receives an elementary stream ES1(V) representing a first video signal and an elementary stream ES1(A) representing the associated first audio signal. The first packetizer provides a first transport stream TS1. A second packetizer 200 receives an elementary stream ES2(V) representing a second video signal and an elementary stream ES2(A) representing the associated second audio signal. The second packetizer provides a second transport stream TS2. Both transport streams TS1 and TS2 comprise packets having a length of 188 bytes. They are applied to a remultiplexer 300 which joins both transport streams TS1 and TS2 into an output transport stream TS.

Further input transport streams TS3,TS4, . . . may be applied to the remultiplexer, and a plurality of remultiplexers may be connected in cascade.

Packetizers 100 and 200 have a similar structure so that one of them will be explained further. As shown in the Figure, packetizer 100 comprises a buffer 101 for temporarily storing the elementary video stream ES1(V) and a buffer 102 for temporarily storing the elementary audio stream ES1(A). The buffers are packetwise read out by a control circuit 120 via a communication bus 130. The control circuit is further adapted to process data in the buffers via the communication bus. The packets read from the buffers are applied to a multiplexer 110.

Eventually, the transport streams TS1 and TS2 are to be decoded by an MPEG2 decoder (not shown). As prescribed by the MPEG2 standard, said decoder comprises an input buffer. CD 13818-1 specifies a portion of this buffer to be allocated to allow multiplexing. The buffer oversize and the momentary bitrate enable the control circuit 120 to establish a timing window in which the current packet must be transmitted. If the packet is transmitted outside said window, overflow and underflow of the decoder's input buffer may occur.

Figure 3:
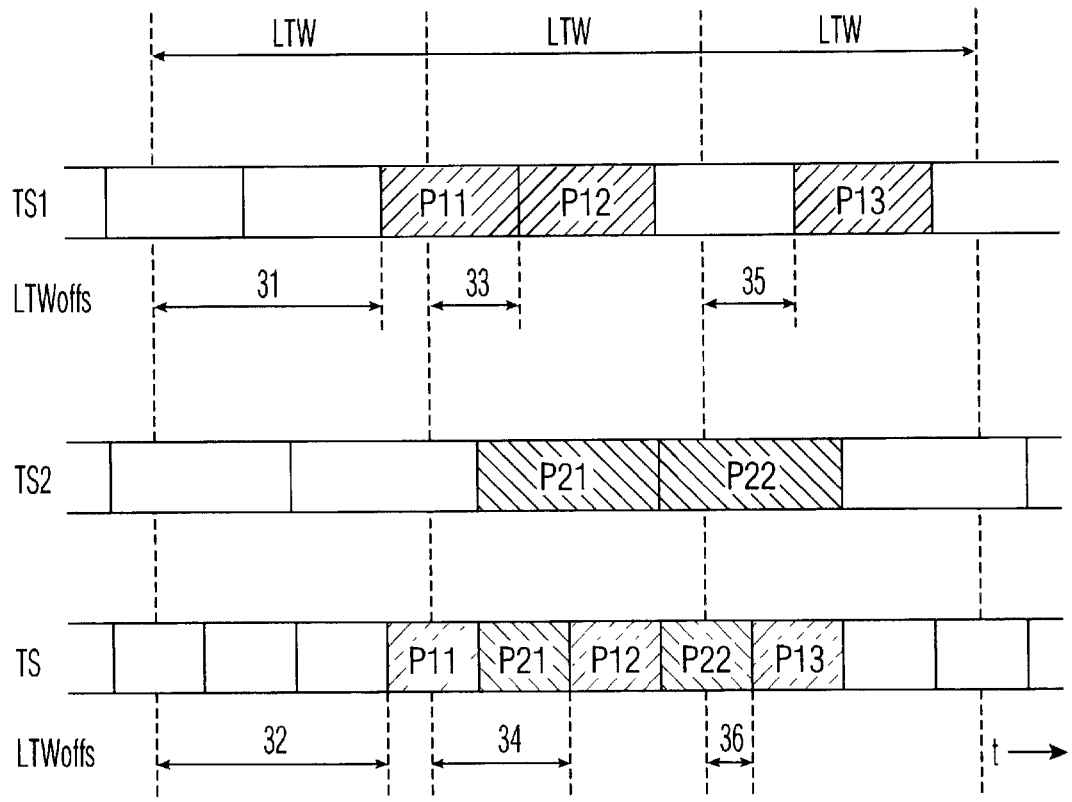
FIG. 3 shows a time diagram to illustrate the operation of the device shown in FIG. 3.

FIG. 3 illustrates the time relation between packets P10, P11,P12,P13 . . . in transport stream TS1 supplied by the first packetizer and the windows in which they are to be transmitted. If this requirement is fulfilled, the transport stream ES is said to be "legal". In view hereof, the windows are also referred to as legal time window. In FIG. 3 they are denoted LTW. In the example shown, all windows are contiguous and have the same length. However, this is not mandatory in practice.

As shown in FIG. 2, a plurality of transport streams is remultiplexed in remultiplexer 300. The remultiplexing operation introduces a positive or negative shift, i.e. jitter, of the packets P10,P11,P12,P13, . . . (see FIG. 3) with respect to their respective windows. If remultiplexer 300 transmits a packet outside its respective window, overflow or underflow of the decoder input buffer may occur. The transport stream is then no longer legal.

In order to assist the remultiplexer 300 in avoiding this situation, the control circuit 120 in packetizer 100 determines the position of the transmitted packets within the respective legal time windows LTW and includes data indicative of said position in the packet. As an example, FIG. 3 shows an offset LTWoffs (31,33,35) between the start of a window and the start of the packet associated therewith. The offset of a packet is accommodated in said packet by the control circuit 120.

The structure of remultiplexer 300 is shown in FIG. 2. The remultiplexer comprises an input buffer 301,302, . . . for each received transport stream TS1,TS2, . . . The buffers are packetwise read out and applied to a multiplexer 310 under control of a control circuit 320. The control circuit 320 is adapted to read and modify the offset LTWoffs accommodated in the packets via a communication bus 330.

The operation will now be described with reference to FIG. 3. This Figure also shows the second transport stream TS2 received from packetizer 200 (FIG. 2) and the resulting transport stream TS. For reasons of clarity, an overall delay between input and output streams is not shown in FIG. 3. Similarly, the legal time windows and offsets associated with packets P20,P21,P22, . . . of the second transport stream TS2 are not shown.

The control circuit 320 reads the offset parameter LTWoffs of each received packet and thus knows the period of time in which the packet must be retransmitted. As an example, consider a LTW length of 4 ms. If a certain packet in an incoming transport stream arrives 0.1 ms after the start of its LTW (LTWoffs=0.1) the control circuit 320 knows that:

If this packet is scheduled 0.1 ms earlier, or 3.9 ms later, the resulting stream will still be legal.

In a conflict between this packet and a packet with a LTWoffs=3.9, the latter must be given priority.

If it is desired to recreate the original momentary rate of a certain elementary stream, the outgoing packets belonging to that elementary stream can all be scheduled so that they acquire the same LTWoffs.

In the example shown in FIG. 3, the control circuit concludes from the offset 31 included in packet P11 that a positive delay of said packets with respect to its legal time window is not allowed. If packet P11 were transmitted later, it would no longer start in the corresponding legal time window. Accordingly, packet P11 from transport stream TS1 is retransmitted without delay and the offset 32 accommodated in the retransmitted packet is not modified. Packet P12, however, is delayed with respect to its legal time window because priority has been given to transmission of packet P21 from the second transport stream TS2. Accordingly, the control circuit modifies the offset 33 accommodated in received packet P12 into a different offset 34 in the retransmitted packet P12. The same applies to packet P13 having an offset 35. This packet P13 is given a negative delay (i.e. smaller than the overall delay) in this example, which yields a new offset 36.

A method of accommodating the relevant parameters in the packets will now be given. The syntax as described in Chapter 2.3 of Draft International Standard CD 13818-1 is used. The relevant parameters are accommodated in the transport stream adaptation field shown in Table 2.6 of CD 13818-1. Table 1 shows a suitable syntax which involves the use of the adaptation field extension flag.

TABLE I

| | | | |
|---|---|---|---|
| if (adaptation_field_extension_flag == '1 '){ | | | |
|     adaptation_field_extension_length | 8 | uimsbf | |
|     remux_field_flag | 1 | bslbf | |
|     reserved | 7 | bslbf | |
|     if (remux_field_flag == '1 '){ | | | |
|         ltw_offset | 12 | uimsbf | |
|         momentary_rate_ratio | 12 | uimsbf | |
|     } | | | |
|     for (i = 0;i<N;i++){ | | | |
|         reserved | 8 | bslbf | |
|     } | | | |
| } | | | |

Herein, the offset parameter LTWoffs is denoted LTW_offset. It is a 12 bit field containing the offset (counted in units of the 90 kHz portion of the system time clock), of the first byte of this packet from the start of a Legal Time Window, LTW, the properties of which are:
1. A fixed length per elementary stream. This length can either be normatively defined within MPEG2 or conveyed by means of a descriptor.
2. If the first byte of this packet is scheduled anywhere within its LTW, no 10 buffer violation occurs.

Figure 4:
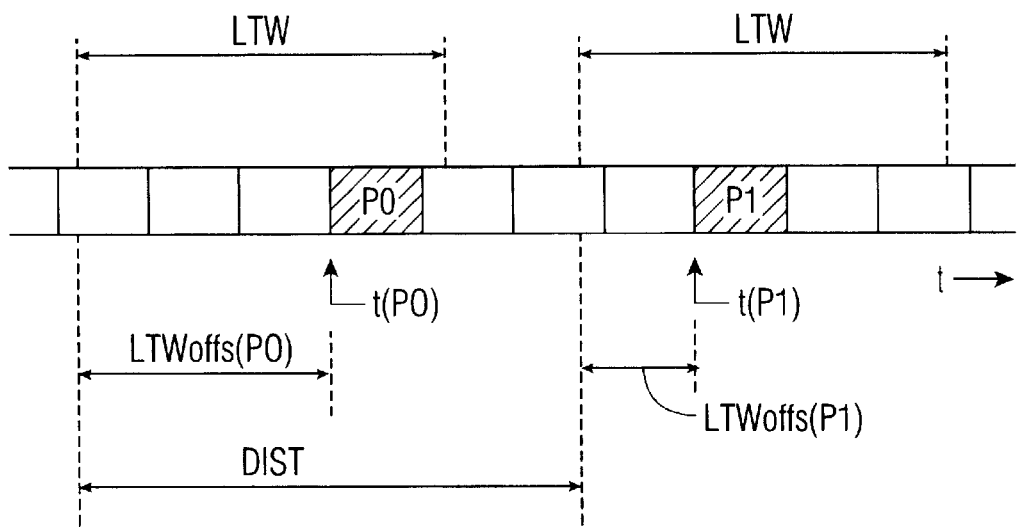
FIG. 4 is a time diagram to illustrate a further embodiment of the method according to the invention.

Transmitting the offset parameter in each packet would create too much overhead. Therefore the offset is inserted in selected packets (packets in which remux_field_flag is set to '1'), together with information about the distance in time between the legal time windows of successive packets of the same elementary stream. The distance between the legal time windows of successive packets of the same elementary stream will be referred to as DIST. An explanatory example is shown in FIG. 4. Knowing the offset LTWoffs(P0) and the arrival time t(P0) of a packet P0, the offset LTWoffs(P1) of the next packet P1 can be computed from its arrival time t(p1) by the equation:

$$LTWoffs(P1)=[t(P1)-t(P0)]-[DIST-LTWoffs(P0)]$$

The distance DIST can be derived from a further parameter (momentary_rate_ratio, see Table I) which is accommodated in the selected packets. Said parameter momentary_rate_ratio is a 12 bit field, which describes the momentary bitrate of this elementary stream computed over a window starting with this packet and ending just before the next packet to contain this field. The momentary rate $R_m$ (in bytes/sec) can be computed by:

$$R_m = \frac{\text{mom rate ratio} + 1}{4096} k \times R_{es}(\max)$$

where k is a factor yet to be determined. Typically, k=1.2 might be considered. $R_m(\max)$ is the maximum bitrate of a variable-rate elementary stream or the bitrate of a constant-rate elementary stream. The distance DIST is now defined by:

$$DIST = \frac{188}{R_m}$$

Finally, some applications using the information encoded above are described. A first application is remultiplexing. In a typical remultiplex operation, several input transport streams are mixed to form an output transport stream. For certain time slots in the output transport stream, collisions may occur; in the worst case, all input streams may have packets ready for scheduling. The remultiplexer must then choose the order of transmission of the different packets. Using the method of the invention, the remultiplexer easily determines what packets are to be given priority.

A second application is the transport of streams having variable bitrates. At the receiving end of a transmission chain, the momentary bitrate of each elementary stream will deviate considerably from the original momentary rate because of accumulated jitter. The method of the invention enables the receiver to recreate the original bitrate. This can be important, for example in certain variable-rate video encoding schemes.

A third application relates to time-critical data transfer. For some applications, e.g. subtitles in a TV program, it is necessary to be able to reconstruct at the receiving end the intended moment of arrival of data which is not video or audio. The method according to the invention makes such a reconstruction possible.

A fourth application is recording and playback. When recording a transport stream containing just one program, the simplest way is to just store sequentially all transport packets belonging to the elementary streams making up that program. However, upon playback, the recorder must know when to place each packet in the outgoing transport stream. Any time slot that will not be occupied by the outgoing packet must be filled with a null packet. The information provided above makes it possible to reconstruct a legal transport stream with hardly any effort.

What is claimed is:

1. A method of producing a digital information signal, comprising:

associating each data packet within a stream of data packets with a time window; and including position information in the each data packet indicating the position of the each data packet within the time window for keeping the each data packet within the time window during transmission of the each data packet.

* * * * *